United States Patent
Finn

(10) Patent No.: US 10,685,433 B2
(45) Date of Patent: Jun. 16, 2020

(54) NONDESTRUCTIVE COATING IMPERFECTION DETECTION SYSTEM AND METHOD THEREFOR

(71) Applicant: United Technologies Corporation, Farmington, CT (US)

(72) Inventor: Alan Matthew Finn, Hebron, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 117 days.

(21) Appl. No.: 15/971,242

(22) Filed: May 4, 2018

(65) Prior Publication Data
US 2019/0340742 A1    Nov. 7, 2019

(51) Int. Cl.
G06T 7/00 (2017.01)
G01N 21/88 (2006.01)
G01N 25/72 (2006.01)
G01N 21/71 (2006.01)

(52) U.S. Cl.
CPC .......... *G06T 7/0002* (2013.01); *G01N 21/71* (2013.01); *G01N 21/8851* (2013.01); *G01N 25/72* (2013.01)

(58) Field of Classification Search
CPC ...... G01N 25/72; G01N 29/228; G01N 21/71; G01N 2203/0062; G01N 2203/0694; G01N 21/00; G01N 21/8851; G06T 2207/10048; G06T 2207/30164; G06T 7/0004; G06T 7/002; G06T 2207/30248; G06T 7/001; H04N 5/33; G06K 9/2018; G06K 9/6267
See application file for complete search history.

(56) References Cited

U.S. PATENT DOCUMENTS

| | | | |
|---|---|---|---|
| 3,804,397 A | 4/1974 | Neumann | |
| 4,402,053 A | 8/1983 | Kelley et al. | |
| 4,403,294 A | 9/1983 | Hamada et al. | |
| 4,873,651 A | 10/1989 | Raviv | |
| 5,064,291 A | 11/1991 | Reiser | |
| 5,119,678 A | 6/1992 | Bashyam et al. | |
| 5,345,514 A | 9/1994 | Mandavieh et al. | |

(Continued)

FOREIGN PATENT DOCUMENTS

| | | |
|---|---|---|
| CA | 2820732 A1 | 12/2014 |
| DE | 19710743 A1 | 9/1998 |

(Continued)

OTHER PUBLICATIONS

U.S. Final Office Action dated Jan. 3, 2019 for corresponding U.S. Appl. No. 15/971,254.

(Continued)

*Primary Examiner* — Jingge Wu
(74) *Attorney, Agent, or Firm* — Bachman & LaPointe, P.C.

(57) ABSTRACT

A nondestructive coating inspection system to inspect a component without removal of a coating thereon, the system including an airflow source to directed heated or cooled air into the component; a sensor directed toward the component to generate an infrared radiation image data of component heated by the heated or cooled air; and a controller in communication with the sensor to register the current infrared radiation image data to at least one infrared reference image data to classify the component based on the comparing.

14 Claims, 10 Drawing Sheets

(56) References Cited

U.S. PATENT DOCUMENTS

| | | |
|---|---|---|
| 5,345,515 A | 9/1994 | Nishi et al. |
| 5,351,078 A | 9/1994 | Lemelson |
| 5,963,328 A | 10/1999 | Yoshida et al. |
| 6,023,637 A * | 2/2000 | Liu ............... A61B 5/015 128/922 |
| 6,153,889 A | 11/2000 | Jones |
| 6,177,682 B1 | 1/2001 | Bartulovic et al. |
| 6,271,520 B1 * | 8/2001 | Tao ............... B07C 5/342 250/330 |
| 6,399,948 B1 | 6/2002 | Thomas |
| 6,434,267 B1 | 8/2002 | Smith |
| 6,462,813 B1 | 10/2002 | Haven et al. |
| 6,690,016 B1 * | 2/2004 | Watkins ........... G01N 25/72 250/341.1 |
| 6,737,648 B2 * | 5/2004 | Fedder ............. G01J 5/02 250/332 |
| 6,759,659 B2 | 7/2004 | Thomas et al. |
| 6,804,622 B2 | 10/2004 | Bunker et al. |
| 6,907,358 B2 | 6/2005 | Suh et al. |
| 6,965,120 B1 | 10/2005 | Beyerer et al. |
| 7,026,811 B2 | 4/2006 | Roney, Jr. et al. |
| 7,064,330 B2 | 6/2006 | Raulerson et al. |
| 7,119,338 B2 | 10/2006 | Thompson et al. |
| 7,122,801 B2 | 10/2006 | Favro et al. |
| 7,129,492 B2 * | 10/2006 | Saito ............... G01N 25/72 250/341.6 |
| 7,164,146 B2 | 1/2007 | Weir et al. |
| 7,190,162 B2 | 3/2007 | Tenley et al. |
| 7,220,966 B2 * | 5/2007 | Saito ............... G01N 25/72 250/341.6 |
| 7,233,867 B2 | 6/2007 | Pisupati et al. |
| 7,240,556 B2 | 7/2007 | Georgeson et al. |
| 7,272,529 B2 | 9/2007 | Hogan et al. |
| 7,313,961 B2 | 1/2008 | Tenley et al. |
| 7,415,882 B2 | 8/2008 | Fetzer et al. |
| 7,446,886 B2 | 11/2008 | Aufmuth et al. |
| 7,489,811 B2 | 2/2009 | Brummel et al. |
| 7,602,963 B2 | 10/2009 | Nightingale et al. |
| 7,689,030 B2 | 3/2010 | Suh et al. |
| 7,724,925 B2 | 5/2010 | Shepard |
| 7,738,725 B2 | 6/2010 | Raskar et al. |
| 7,823,451 B2 | 11/2010 | Sarr |
| 7,966,883 B2 | 6/2011 | Lorraine et al. |
| 8,204,294 B2 | 6/2012 | Alloo et al. |
| 8,208,711 B2 | 6/2012 | Venkatachalam et al. |
| 8,221,825 B2 | 7/2012 | Reitz et al. |
| 8,239,424 B2 | 8/2012 | Haigh et al. |
| 8,431,917 B2 | 4/2013 | Wang et al. |
| 8,449,176 B2 | 5/2013 | Shepard |
| 8,520,931 B2 | 8/2013 | Tateno |
| 8,528,317 B2 | 9/2013 | Gerez et al. |
| 8,692,887 B2 | 4/2014 | Ringermacher et al. |
| 8,744,166 B2 | 6/2014 | Scheid et al. |
| 8,761,490 B2 | 6/2014 | Scheid et al. |
| 8,781,209 B2 | 7/2014 | Scheid et al. |
| 8,781,210 B2 | 7/2014 | Scheid et al. |
| 8,792,705 B2 | 7/2014 | Scheid et al. |
| 8,913,825 B2 | 12/2014 | Taguchi et al. |
| 8,983,794 B1 | 3/2015 | Motzer et al. |
| 9,037,381 B2 | 5/2015 | Care |
| 9,046,497 B2 | 6/2015 | Kush et al. |
| 9,066,028 B1 * | 6/2015 | Koshti ............. H04N 5/33 |
| 9,080,453 B2 | 7/2015 | Shepard et al. |
| 9,116,071 B2 | 8/2015 | Hatcher, Jr. et al. |
| 9,134,280 B2 | 9/2015 | Cataldo et al. |
| 9,146,205 B2 | 9/2015 | Renshaw et al. |
| 9,151,698 B2 | 10/2015 | Jahnke et al. |
| 9,154,743 B2 | 10/2015 | Hatcher, Jr. et al. |
| 9,240,049 B2 | 1/2016 | Ciurea et al. |
| 9,251,582 B2 | 2/2016 | Lim et al. |
| 9,300,865 B2 | 3/2016 | Wang et al. |
| 9,305,345 B2 | 4/2016 | Lim et al. |
| 9,458,735 B1 | 10/2016 | Diwinsky et al. |
| 9,465,385 B2 | 10/2016 | Kamioka et al. |
| 9,467,628 B2 | 10/2016 | Geng et al. |
| 9,471,057 B2 | 10/2016 | Scheid et al. |
| 9,476,798 B2 | 10/2016 | Pandey et al. |
| 9,476,842 B2 | 10/2016 | Drescher et al. |
| 9,483,820 B2 | 11/2016 | Lim et al. |
| 9,488,592 B1 | 11/2016 | Maresca et al. |
| 9,519,844 B1 | 12/2016 | Thompson et al. |
| 9,594,059 B1 | 3/2017 | Brady et al. |
| 9,734,568 B2 | 5/2017 | Vajaria et al. |
| 9,785,919 B2 | 10/2017 | Diwinsky et al. |
| 9,804,997 B2 | 10/2017 | Sharp et al. |
| 9,808,933 B2 | 11/2017 | Lin et al. |
| 2002/0121602 A1 | 9/2002 | Thomas et al. |
| 2002/0167660 A1 | 11/2002 | Zaslavsky |
| 2003/0117395 A1 | 6/2003 | Yoon |
| 2003/0205671 A1 | 11/2003 | Thomas et al. |
| 2004/0089811 A1 | 5/2004 | Lewis et al. |
| 2004/0089812 A1 | 5/2004 | Favro et al. |
| 2004/0139805 A1 | 7/2004 | Antonelli et al. |
| 2004/0201672 A1 | 10/2004 | Varadarajan et al. |
| 2004/0240600 A1 | 12/2004 | Freyer et al. |
| 2004/0245469 A1 | 12/2004 | Favro et al. |
| 2004/0247170 A1 | 12/2004 | Furze et al. |
| 2005/0008215 A1 | 1/2005 | Shepard |
| 2005/0151083 A1 | 7/2005 | Favro et al. |
| 2005/0167596 A1 | 8/2005 | Rothenfusser et al. |
| 2005/0276907 A1 * | 12/2005 | Harris ............. G01N 21/8422 427/8 |
| 2006/0012790 A1 * | 1/2006 | Furze ............. G01N 21/8422 356/402 |
| 2006/0086912 A1 * | 4/2006 | Weir ............. G01N 21/8422 250/559.4 |
| 2007/0017297 A1 | 1/2007 | Georgeson et al. |
| 2007/0045544 A1 | 3/2007 | Favro et al. |
| 2008/0022775 A1 | 1/2008 | Sathish et al. |
| 2008/0053234 A1 | 3/2008 | Staroselsky et al. |
| 2008/0111074 A1 * | 5/2008 | Weir ............. G01N 21/21 250/338.1 |
| 2008/0183402 A1 | 7/2008 | Malkin et al. |
| 2008/0229834 A1 | 9/2008 | Bossi et al. |
| 2008/0247635 A1 | 10/2008 | Davis et al. |
| 2008/0247636 A1 | 10/2008 | Davis et al. |
| 2009/0000382 A1 | 1/2009 | Sathish et al. |
| 2009/0010507 A1 | 1/2009 | Geng |
| 2009/0066939 A1 | 3/2009 | Venkatachalam et al. |
| 2009/0128643 A1 | 5/2009 | Kondo et al. |
| 2009/0252987 A1 | 10/2009 | Greene, Jr. |
| 2009/0279772 A1 | 11/2009 | Sun et al. |
| 2009/0312956 A1 | 12/2009 | Zombo et al. |
| 2011/0062339 A1 | 3/2011 | Ruhge et al. |
| 2011/0123093 A1 * | 5/2011 | Alloo ............... G01N 25/72 382/149 |
| 2011/0299752 A1 * | 12/2011 | Sun ............... G06K 9/00201 382/131 |
| 2012/0154599 A1 | 6/2012 | Huang |
| 2012/0249959 A1 | 10/2012 | You et al. |
| 2012/0275667 A1 | 11/2012 | Lu |
| 2012/0293647 A1 | 11/2012 | Singh et al. |
| 2013/0028478 A1 | 1/2013 | St-Pierre et al. |
| 2013/0041614 A1 * | 2/2013 | Shepard ............. G01J 5/0014 702/130 |
| 2013/0070897 A1 | 3/2013 | Jacotin |
| 2013/0113914 A1 | 5/2013 | Scheid et al. |
| 2013/0113916 A1 | 5/2013 | Scheid et al. |
| 2013/0235897 A1 | 9/2013 | Bouteyre et al. |
| 2013/0250067 A1 | 9/2013 | Laxhuber et al. |
| 2014/0022357 A1 | 1/2014 | Yu et al. |
| 2014/0056507 A1 | 2/2014 | Doyle et al. |
| 2014/0098836 A1 | 4/2014 | Bird |
| 2014/0184786 A1 | 7/2014 | Georgeson et al. |
| 2014/0198185 A1 | 7/2014 | Haugen et al. |
| 2014/0200832 A1 | 7/2014 | Troy et al. |
| 2015/0041654 A1 | 2/2015 | Barychev et al. |
| 2015/0046098 A1 | 2/2015 | Jack et al. |
| 2015/0086083 A1 | 3/2015 | Chaudhry et al. |
| 2015/0128709 A1 | 5/2015 | Stewart et al. |
| 2015/0138342 A1 | 5/2015 | Brdar et al. |
| 2015/0185128 A1 | 7/2015 | Chang et al. |
| 2015/0233714 A1 | 8/2015 | Kim |

(56) References Cited

U.S. PATENT DOCUMENTS

| | | | |
|---|---|---|---|
| 2015/0253266 | A1 | 9/2015 | Lucon et al. |
| 2016/0012588 | A1 | 1/2016 | Taguchi et al. |
| 2016/0043008 | A1 | 2/2016 | Murray et al. |
| 2016/0109283 | A1 | 4/2016 | Broussais-Colella et al. |
| 2016/0178532 | A1 | 6/2016 | Lim et al. |
| 2016/0241793 | A1 | 8/2016 | Ravirala et al. |
| 2016/0284098 | A1* | 9/2016 | Okumura ............... H04N 5/247 |
| 2016/0314571 | A1 | 10/2016 | Finn et al. |
| 2016/0328835 | A1 | 11/2016 | Maresca, Jr. et al. |
| 2016/0334284 | A1* | 11/2016 | Kaplun Mucharrafille ................. G01K 15/005 |
| 2017/0011503 | A1 | 1/2017 | Newman |
| 2017/0023505 | A1 | 1/2017 | Maione et al. |
| 2017/0052152 | A1 | 2/2017 | Tat et al. |
| 2017/0085760 | A1 | 3/2017 | Ernst et al. |
| 2017/0090458 | A1 | 3/2017 | Lim et al. |
| 2017/0122123 | A1 | 5/2017 | Kell et al. |
| 2017/0184469 | A1 | 6/2017 | Chang et al. |
| 2017/0184549 | A1 | 6/2017 | Reed et al. |
| 2017/0184650 | A1 | 6/2017 | Chang et al. |
| 2017/0211408 | A1* | 7/2017 | Ahmadian ............ F01D 17/085 |
| 2017/0221274 | A1 | 8/2017 | Chen et al. |
| 2017/0234837 | A1 | 8/2017 | Hall et al. |
| 2017/0258391 | A1 | 9/2017 | Finn et al. |
| 2017/0262965 | A1 | 9/2017 | Xiong et al. |
| 2017/0262977 | A1 | 9/2017 | Finn et al. |
| 2017/0262979 | A1 | 9/2017 | Xiong et al. |
| 2017/0262985 | A1 | 9/2017 | Finn et al. |
| 2017/0262986 | A1 | 9/2017 | Xiong et al. |
| 2017/0270651 | A1 | 9/2017 | Bailey et al. |
| 2017/0297095 | A1 | 10/2017 | Zalameda et al. |
| 2018/0002039 | A1 | 1/2018 | Finn et al. |
| 2018/0005362 | A1 | 1/2018 | Wang et al. |
| 2018/0013959 | A1 | 1/2018 | Slavens et al. |
| 2018/0019097 | A1 | 1/2018 | Harada et al. |
| 2018/0098000 | A1 | 4/2018 | Park et al. |
| 2018/0111239 | A1 | 4/2018 | Zak et al. |
| 2019/0299542 | A1* | 10/2019 | Webb .................... B29C 70/388 |

FOREIGN PATENT DOCUMENTS

| | | |
|---|---|---|
| EP | 1961919 A2 | 8/2008 |
| GB | 2545271 A | 6/2017 |
| JP | 2015161247 A | 9/2015 |
| SG | 191452 A1 | 7/2013 |
| WO | 2016112018 A1 | 7/2016 |
| WO | 2016123508 A1 | 8/2016 |
| WO | 2016176524 A1 | 11/2016 |

OTHER PUBLICATIONS

Gao et al., 'A Statistical Method for Crack Detection from Vibrothermography Inspection Data',(2010) Statistics Preprints. Paper 68. http://lib.dr.iastate.edu/stat_las_preprints/68.

Li1 Ming; Holland1 Stephen D.; and Meeker1 William Q.1 "Statistical Methods for Automatic Crack Detection Based on Vibrothermography Sequence-of-Images Data" (2010). Statistics Preprints. 69.

Henneke et al. 'Detection of Damage in Composite Materials by Vibrothermography', ASTM special technical publication (696), American Society for Testing and Materials, 1979, pp. 83-95.

http://www.npl.co.uk/commercial-services/sector-case-studies/thermal-imaging-reveals-the-invisible; Apr. 17, 2012.

Tian et al., 'A Statistical Framework for Improved Automatic Flaw Detection in Nondestructive Evaluation Images', Technometrics, 59, 247-261. Feb. 1, 2017.

Emmanuel J. Cand'es1,2, Xiaodong Li2, Yl Ma3,4, and John Wright4, "Robust Principal Component Analysis", (1)Department of Statistics, Stanford University, Stanford, CA; (2)Department of Mathematics, Stanford University, Stanford, CA; (3, 4) Electrical and Computer Engineering, UIUC, Urbana, IL (4) Microsoft Research Asia, Beijing, China, Dec. 17, 2009.

Sebastien Parent; "From Human to Machine: How to Be Prepared for Integration of Automated Visual Inspection"Quality Magazine, https://www.qualitymag.com/articles/91976. Jul. 2, 2014.

http://www.yxlon.com/products/x-ray-and-ct-inspection-systems/yxlon-mu56-tb, 2016.

U.S. Office action dated Jul. 23, 2018 issued in corresponding U.S. Appl. No. 15/971,254.

Blachnio et al, "Assessment of Technical Condition Demonstrated by Gas Turbine Blades by Processing of Images of Their Surfaces", Journal of KONBiN, 1(21), 2012, pp. 41-50.

Raskar et al., 'A Non-photorealistic Camera: Depth Edge Detection and Stylized Rendering using Multi-flash Imaging' ACM Transactions on Graphics, 2004 http://www.merl.com/publications/docs/TR2006-107.pdf.

Feris et al., 'Specular Reflection Reduction with Multi-Flash Imaging', 17th Brazilian Symposium on Computer Graphics and Image Processing, 2004. http://rogerioferis.com/publications/FerisSIB04.pdf.

Holland, "First Measurements from a New Broadband Vibrothermography Measurement System", AIP Conference Proceedings, 894 (2007), pp. 478-483. http://link.aip.org/link/doi/10.1063/1.2718010\.

Gao et al., 'Detecting Cracks in Aircraft Engine Fan Blades Using Vibrothermography Nondestructive Evaluation', RESS Special Issue on Accelerated Testing, 2014, http://dx.doi.org/10.1016/j.ress.2014.05.009.

Gao et al., 'A Statistical Method for Crack Detection from Vibrothermography Inspection Data', Statistics Preprints. Paper 68. http://lib.dr.iastate.edu/stat_las_preprints/68.

Holland, 'Thermographic Signal Reconstruction for Vibrothermography', Infrared Physics & Technology 54 (2011) 503-511.

Li et al., 'Statistical Methods for Automatic Crack Detection Based on Vibrothermography Sequence-of-Images Data', Statistics Preprints. Paper 69. http://lib.dr.iastate.edu/stat_las_preprints/69.

Tian et al., 'A Statistical Framework for Improved Automatic Flaw Detection in Nondestructive Evaluation Images', Technometrics, 59, 247-261.

Henneke et al. 'Detection of Damage in Composite Materials by Vibrothermography', ASTM special technical publication (696), 1979, pp. 83-95.

http://www.npl.co.uk/commercial-services/sector-case-studies/thermal-imaging-reveals-the-invisible.

U.S. Non-Final Office Action dated Apr. 16, 2019 for corresponding U.S. Appl. No. 15/970,985.

E. J. Candès, X. Li, Y. Ma, and J. Wright, "Robust Principal Component Analysis", submitted. http://www-stat.stanford.edu/~candes/papers/RobustPCA.pdf.

M. Sznaier, O. Camps, N. Ozay, T. Ding, G. Tadmor and D. Brooks, "The Role of Dynamics in Extracting Information Sparsely Encoded in High Dimensional Data Streams", in Dynamics of Information Systems, Hirsch, M.J.; Pardalos, P.M.; Murphey, R. (Eds.), pp. 1-28, Springer Verlag, 2010.

M. Fazel, H. Hindi, and S. Boyd, "A Rank Minimization Heuristic with Application to Minimum Order System Approximation", American Control Conference, Arlington, Virginia, pp. 4734-4739, Jun. 2001.

Meola et al., 'An Excursus on Infrared Thermography Imaging', J. Imaging 2016, 2, 36 http://www.mdpi.com/2313-433X/2/4/36/pdf.

Yu et al., 'ASIFT: An Algorithm for Fully Affine Invariant Comparison', Image Processing on Line on Feb. 24, 2011. http://www.ipol.im/pub/art/2011/my-asift/article.pdf.

Schemmel et al., 'Measurement of Direct Strain Optic Coefficient of YSZ Thermal Barrier Coatings at Ghz Frequencies', Optics Express, v.25, n.17, Aug. 21, 2017, https://doi.org/10.1364/OE.25.019968.

Jean-Yves Bouguet, "Camera Calibration Toolbox for Matlab", http://www.vision.caltech.edu/bouguetj/calib_doc/, accessed on Nov. 10, 2017.

https://www.qualitymag.com/articles/91976-from-human-to-machine-how-to-be-prepared-for-integration-of-automated-visual-inspection.

http://www.yxlon.com/products/x-ray-and-ct-inspection-systems/yxlon-mu56-tb.

(56) References Cited

OTHER PUBLICATIONS

Yu et al. 'Shadow Graphs and 3D Texture Reconstruction', IJCV, vol. 62, No. 1-2, 2005, pp. 35-60.
U.S. Non-Final Office Action dated Mar. 5, 2019 for corresponding U.S. Appl. No. 15/971,227.
U.S. Non-Final Office Action dated May 28, 2019 for corresponding U.S. Appl. No. 15/971,214.
U.S. Non-Final Office Action dated Nov. 26, 2019 for corresponding U.S. Appl. No. 15/971,194.

* cited by examiner

NONDESTRUCTIVE COATING IMPERFECTION DETECTION SYSTEM AND METHOD THEREFOR

BACKGROUND

The present disclosure relates to nondestructive component inspection and, more particularly, to a nondestructive coating inspection system for prognostics and health management, preventative maintenance, and repair of engine parts.

Hot section turbine components in aircraft and industrial gas turbine engines are protected by thermal barrier coatings (TBCs) that provide thermal insulation against high temperatures, and by environmental barrier coatings (EBCs) that provide resistance to environmental attack such as that due to oxidation, corrosion, and recession. TBCs have been used to protect metallic components, especially those constructed from nickel-based superalloys in the hot section of gas turbine engines, such as turbine blades, vanes, endwalls, air seals, and combustor liners. TBCs allow for higher gas temperature operation by protecting components exposed to high temperature gases from thermally activated damage such as melting, creep, oxidation, corrosion, and cyclic thermo-mechanical fatigue, which results in improved fuel consumption, increased thrust or power generation, reduced emissions, improved reliability, reduced cooling requirements, and reduced cost by extended service life and extended time between maintenance intervals.

Thermal protection is typically provided by a ceramic top coat. Coatings are often multilayered systems that include a thermally insulating and porous ceramic topcoat applied on top of various interface and EBC layers that provide additional environmental protection, as well as bonding to the metal alloy substrate. The EBCs and TBCs are considered to be prime reliant, hence are inspected for proper coverage; otherwise, premature field failure may occur. These components are currently inspected manually by visual or tactile inspection. These inspection techniques may be tedious, time consuming, and imprecise.

Several automated inspection processes have been developed based on rapid exterior heating of the component and infrared imaging. For instance, pulsed thermography, where a very short intense flash of light heats a component, has been used to show thermal conductivity of a coating. Similarly, a periodic external thermal signal may be applied to a component and a phase difference in the thermal response indicates damage. These methods, however, require external heating of the component, which may not allow detection of all the desired imperfections, and currently lack automated image analysis for the determination of imperfections and damage.

Methods based on 2D image analytics in visible light have been developed, but these methods are not suitable, for instance, for shallow spallation or for damage on concave surfaces. Methods based on 3D analytics have been developed, but these methods require high resolution 3D scans, which can be slow, and may not detect imperfections such as cracks, delamination, and incorrect coating thickness.

SUMMARY

A nondestructive coating inspection system, the system according to one disclosed non-limiting embodiment of the present disclosure includes an airflow source to direct one or more of heated and cooled air into a component; a sensor directed toward the component to generate an infrared radiation image data of the component heated by the heated air; and a controller in communication with the sensor to register the current infrared radiation image data to at least one infrared reference image data to classify the component based on the comparing.

A further embodiment of any of the foregoing embodiments of the present disclosure includes that the controller is operable to estimate a thermal transfer function at one or more pixels of the current infrared radiation image data for comparison to a thermal transfer function at one or more pixels of the at least one reference image.

A further embodiment of any of the foregoing embodiments of the present disclosure includes a thermography system.

A further embodiment of any of the foregoing embodiments of the present disclosure includes one or more of a short-wave infrared (SWIR) module, a mid-wave infrared (MWIR) module, a long-wave infrared (LWIR) module, a very long-wave infrared (VLWIR) module, and a broadband infrared module.

A further embodiment of any of the foregoing embodiments of the present disclosure includes that the thermography system utilizes beam splitters to view the component through a single lens.

A further embodiment of any of the foregoing embodiments of the present disclosure includes an image recognition algorithm to match a location of the component against a database that contains images of previously inspected components wherein the images of previously inspected components have associated previous transfer functions.

A further embodiment of any of the foregoing embodiments of the present disclosure includes a multiple of reference images.

A further embodiment of any of the foregoing embodiments of the present disclosure includes that the transfer function of a location of a component and a previous transfer function is utilized to determine acceptable and unacceptable components.

A further embodiment of any of the foregoing embodiments of the present disclosure includes that the database is utilized to score a component being inspected.

A method for nondestructive coating inspection of a component, the method according to one disclosed non-limiting embodiment of the present disclosure includes communicating one or more of heated and cooled air into a component; determining an infrared radiation image data of the component at least one of before, during, and after the heated air is communicated into the component; comparing the infrared radiation image data to at least one reference image; and classifying the component based on the comparing.

A further embodiment of any of the foregoing embodiments of the present disclosure includes identifying whether the component is acceptable or unacceptable.

A further embodiment of any of the foregoing embodiments of the present disclosure includes estimating a thermal transfer function at one or more pixels of the current infrared radiation image.

A further embodiment of any of the foregoing embodiments of the present disclosure includes comparing the thermal transfer function at one or more pixels of the current infrared radiation image data to a thermal transfer function at one or more pixels of the at least one reference image.

A further embodiment of any of the foregoing embodiments of the present disclosure includes that the thermal transfer function at one or more pixels of the at least one infrared reference image data is a representation of an ideal component.

A further embodiment of any of the foregoing embodiments of the present disclosure includes determining a difference between the thermal transfer function at one or more pixels of the current infrared radiation image data to the thermal transfer function at one or more pixels of the at least one reference image.

A further embodiment of any of the foregoing embodiments of the present disclosure includes determining one or more of a sum of the absolute value of the coefficient-by-coefficient differences, a Bhattacharyya distance, a Kantorovich metric, a Kolmogorov-Smirnov statistic, and a Kullback-Leibler divergence.

A further embodiment of any of the foregoing embodiments of the present disclosure includes determining at least one of a coating thickness, adhesion, or crack in a coating of the component.

A further embodiment of any of the foregoing embodiments of the present disclosure includes that the difference determines whether the component is acceptable or unacceptable.

A further embodiment of any of the foregoing embodiments of the present disclosure includes modeling an internal structure of a component at one or more pixels of the current infrared radiation image.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
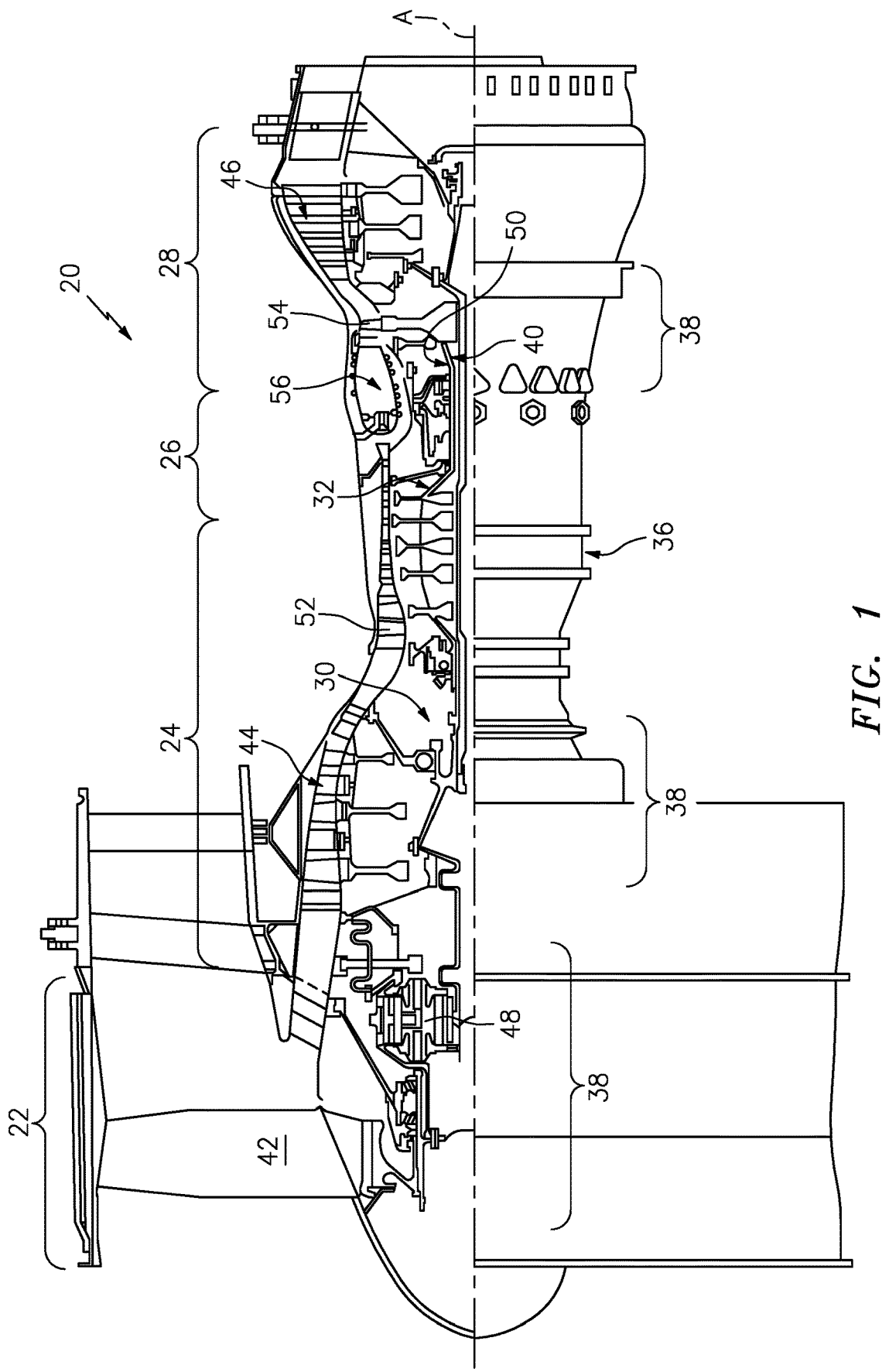
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and along a core flowpath for compression by the compressor section 24, communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engine architectures.

The engine 20 generally includes a low spool 30 and a high spool 32 mounted for rotation about an engine central longitudinal axis "A". The low spool 30 generally includes an inner shaft 40 that interconnects a fan 42, a low pressure compressor ("LPC") 44 and a low pressure turbine ("LPT") 46. The inner shaft 40 drives the fan 42 directly, or through a geared architecture 48 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis "A", which is collinear with their longitudinal axes.

Core airflow is compressed by the LPC 44, then the HPC 52, mixed with the fuel and burned in the combustor 56, then expanded over the HPT 54, then the LPT 46. The turbines 54, 46 rotationally drive the respective high spool 32 and low spool 30 in response to the expansion. The main engine shafts 40, 50 are supported at a plurality of points by bearing structures 38 within the engine case structure 36.

Figure 2:
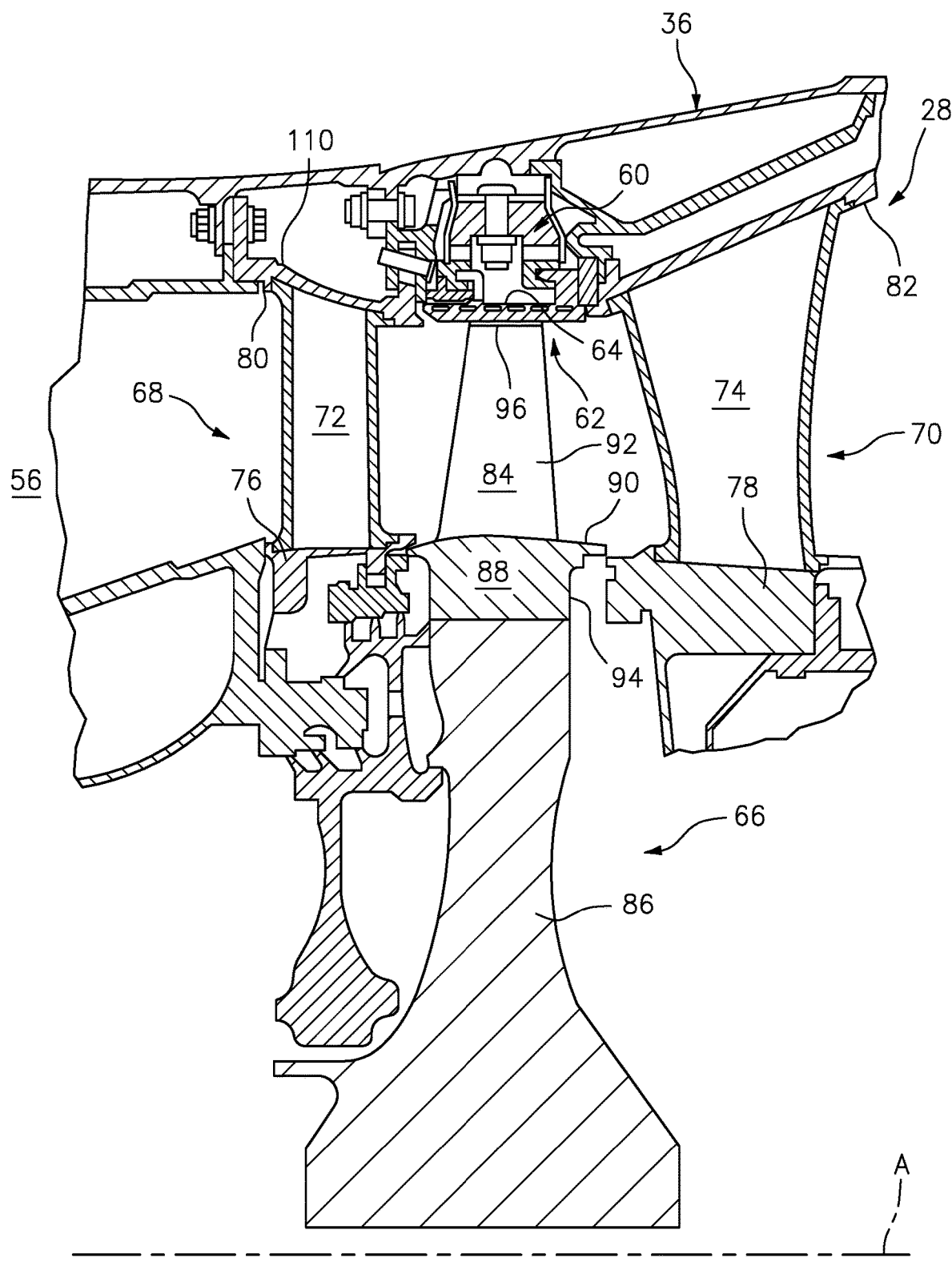
FIG. 2 is an enlarged schematic cross-section of an engine turbine section.

With reference to FIG. 2, an enlarged schematic view of a portion of the turbine section 28 is shown by way of example; however, other engine sections will also benefit herefrom. A shroud assembly 60 within the engine case structure 36 supports a blade outer air seal (BOAS) assembly 62 with a multiple of circumferentially distributed BOAS 64 proximate to a rotor assembly 66 (one schematically shown).

The shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36.

The rotor assembly 66 includes an array of blades 84 circumferentially disposed around a disk 86. Each blade 84 includes a root 88, a platform 90 and an airfoil 92 (also shown in FIG. 3). The blade roots 88 are received within a rim 94 of the disk 86 and the airfoils 92 extend radially outward such that a tip 96 of each airfoil 92 is closest to the blade outer air seal (BOAS) assembly 62. The platform 90 separates a gas path side inclusive of the airfoil 92 and a non-gas path side inclusive of the root 88.

Figure 3:
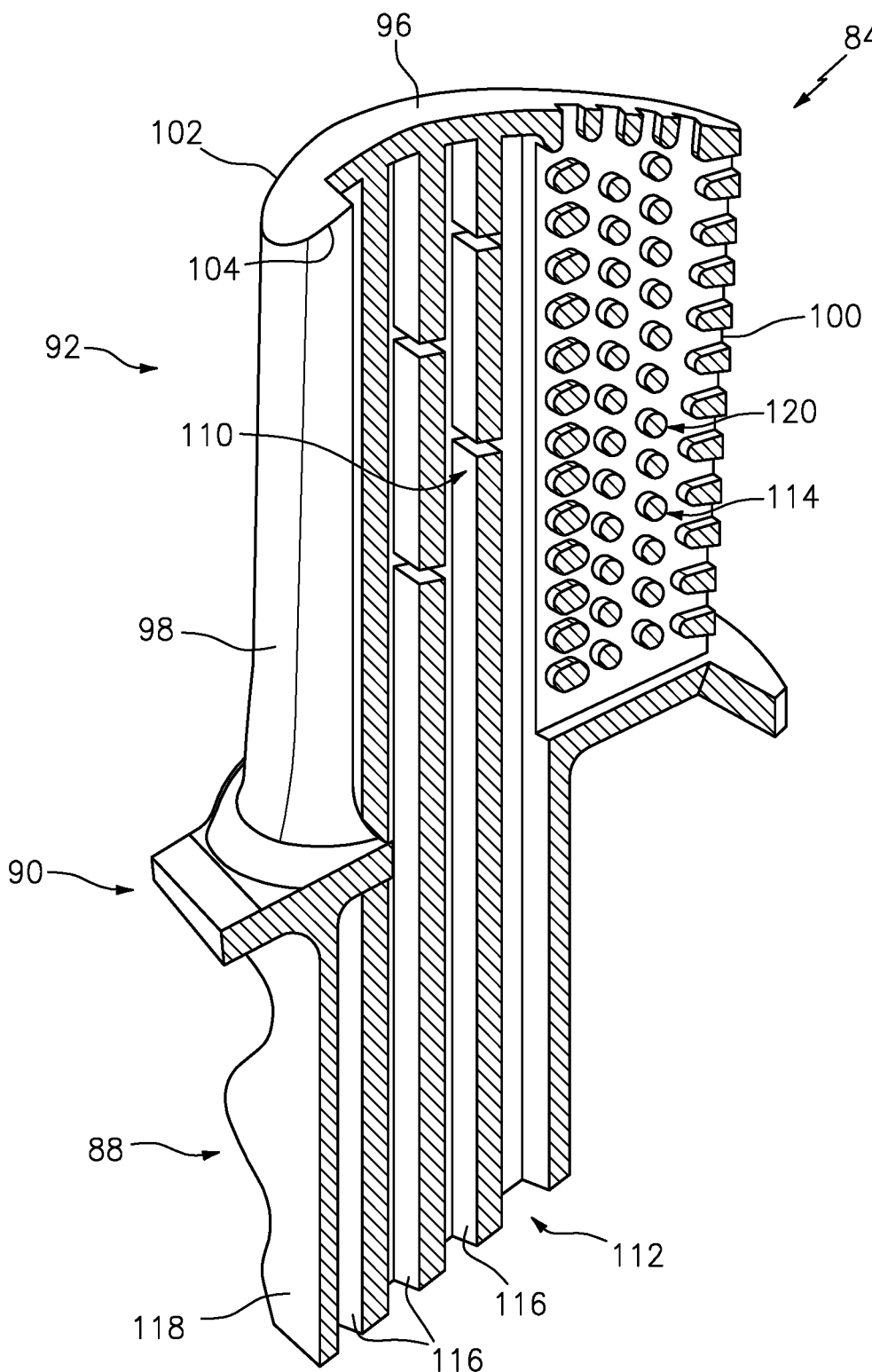
FIG. 3 is a perspective view of an airfoil as an example component for use with a coating method showing the internal architecture.

With reference to FIG. 3, the platform 90 generally separates the root 88 and the airfoil 92 to define an inner boundary of a gas path. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90. It should be appreciated that the tip 96 may include a recessed portion.

To resist the high temperature stress environment in the gas path of a turbine engine, each blade 84 may be formed by casting. It should be appreciated that although a blade 84 with an array of internal passageways 110 (shown schematically) will be described and illustrated in detail, other components including, but not limited to, vanes, turbine shrouds, end walls and others which are coated will also benefit from the teachings herein.

The external airfoil surface may be protected by a coating that overlies and contacts the external airfoil surface. Such coatings may be of the MCrAlX type. The terminology "MCrAlX" is a shorthand term of art for a variety of families of overlay protective layers that may be employed as environmental coatings or bond coats in thermal barrier coating systems. In this, and other forms, M refers to nickel, cobalt, iron, and combinations thereof. In some of these protective coatings, the chromium may be omitted. The X denotes elements such as hafnium, zirconium, yttrium, tantalum, rhenium, ruthenium, palladium, platinum, silicon, titanium, boron, carbon, and combinations thereof. Specific compositions are known in the art. Optionally, a ceramic layer overlies and contacts the protective layer. The ceramic layer is preferably yttria-stabilized zirconia, which is a zirconium oxide. Other operable ceramic materials may be used as well. Typically, when there is no ceramic layer present, the protective layer is termed an "environmental coating". When there is a ceramic layer present, the protective layer is termed a "bond coat".

Figure 4:
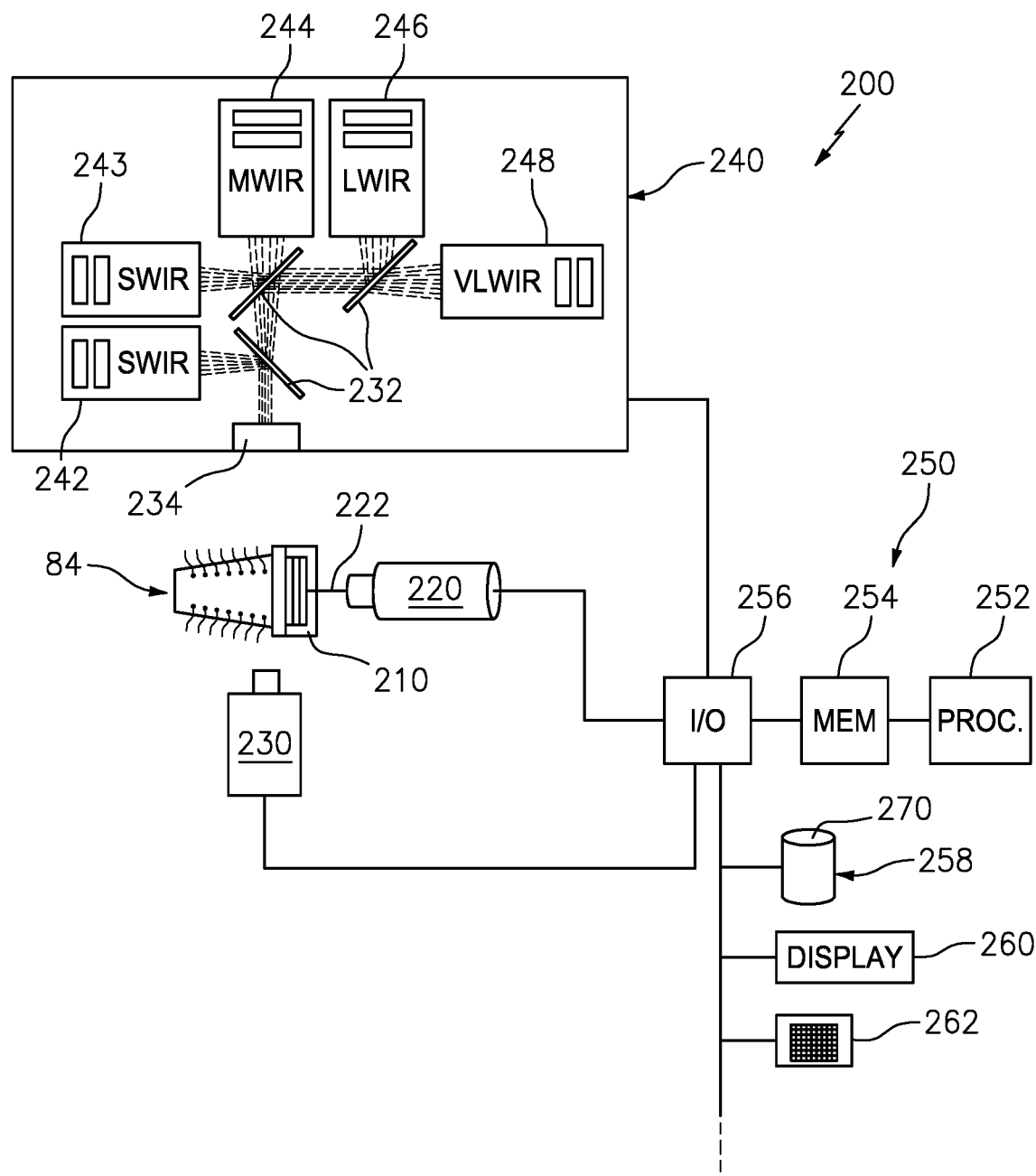
FIG. 4 is a schematic view of a nondestructive coating inspection system.

With reference to FIG. 4, a nondestructive coating inspection system 200 combines thermal imaging techniques to produce a nondestructive inspection technique that does not require stripping of environmental barrier coatings or thermal barrier coating systems.

The nondestructive coating inspection system 200 includes a fixture 210 to retain a component such as the blade 84, a thermal excitation source 220, a sensor system 230, a thermography system 240, and a control system 250. The thermal excitation source 220 that is capable of generating a broad range of heated or cooled airflows 222 generally significantly above or below ambient temperature, for example, airflows at temperatures between −40° C. and 400° C.

The thermography system 240, for example, includes a spectrometer operable to acquire infrared image data over a wide spectral signature, from 0.5 to 22 μm in wavelength. In one example, the thermography system 240 may include one or more of a short-wave infrared (SWIR) module 242, a mid-wave infrared (MWIR) module 244, a long-wave infrared (LWIR) module 246, a very long-wave infrared (VLWIR) module 248, and a broadband infrared module (not shown) that optionally utilize beam splitters 232 when multiple spectra are separately imaged to view a component such as an example blade 84 through a single lens 234. Short-wave infrared (SWIR) refers to nonvisible light falling between 1400 and 3000 nanometers (nm) in wavelength. Mid-wave infrared (MWIR) is a subset of the infrared band of the electromagnetic spectrum, covering the wavelengths ranging from 3 μm to 5 μm (3000 nm to 5000 nm). Long-wave infrared (LWIR) is a subset of the infrared band of the electromagnetic spectrum, covering the wavelengths ranging from the wavelengths ranging from 8 μm to 14 μm (8000 nm to 14000 nm). Very long-wave infrared (VLWIR) is a subset of the infrared band of the electromagnetic spectrum, covering the wavelengths ranging from the wavelengths ranging from the 12 μm to 22 μm (12000 nm to 22000 nm). In alternative embodiments, parallel optical channels are used with bandpass filters to separate the multispectral bands. In yet another embodiment, a multispectral random imaging camera may be used.

The control 250 includes at least one computing device, that may include hardware, firmware, and/or software components that are configured to perform the functions disclosed herein, including the operation of the thermal excitation source 220, the sensor system 230, and the thermography system 240. While not specifically shown, the control 250 may include other computing devices (e.g., servers, mobile computing devices, etc.) and computer aided manufacturer (CAM) systems which may be in communication with each other and/or the control 250 via a communication network to perform one or more of the disclosed functions.

The control 250 may include at least one processor 252 (e.g., an embedded computer, a controller, microprocessor, microcontroller, digital signal processor, FPGA, etc.), memory 254, and an input/output (I/O) subsystem 256. The control 250 may be embodied as any type of computing device (e.g., a workstation, a tablet computer, smart phone, body-mounted device or wearable device, etc.), a server, an enterprise computer system, a network of computers, a combination of computers and other electronic devices, or other electronic devices. Although not specifically shown, the I/O subsystem 256 typically includes, for example, an I/O controller, a memory controller, and one or more I/O ports. The processor 252 and the I/O subsystem 256 are communicatively coupled to the memory 254. The memory 254 may be embodied as any type of computer memory device (e.g., volatile memory such as various forms of random access memory).

The I/O subsystem 256 may also be communicatively coupled to a number of hardware, firmware, and/or software components, including a data storage device 258, a display 260, and a user interface (UI) subsystem 262. The data storage device 258 may include one or more hard drives or other suitable persistent storage devices (e.g., flash memory, memory cards, memory sticks, and/or others). A database 270 for the thermal excitation source 220, the sensor system 230, and the thermography system 240 may reside at least temporarily in the data storage device 258 and/or other data storage devices (e.g., data storage devices that are "in the cloud" or otherwise connected to the control 250 by a network).

Figure 5:
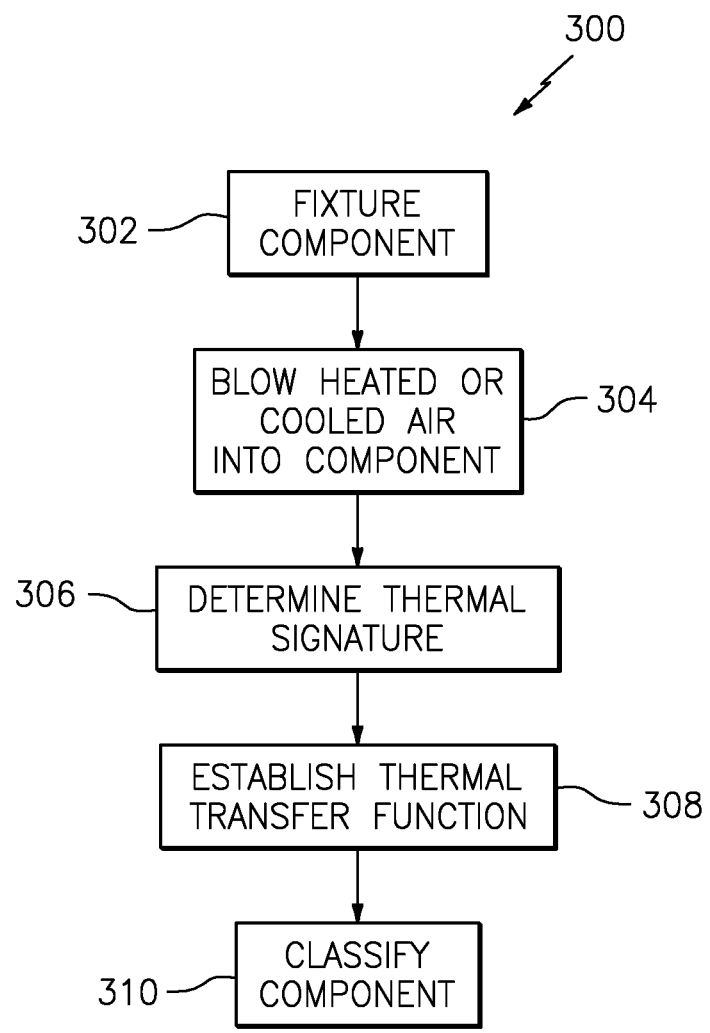
FIG. 5 is a block diagram representing a method of inspection using the nondestructive coating inspection system.

With reference to FIG. 5, one disclosed non-limiting embodiment of a method 300 for nondestructive component inspection of a component such as the blade 84 (FIG. 3) using the nondestructive coating inspection system 200 initially includes locating the component in the fixture 210 (step 302) to provide system identification via transfer function estimation and comparison to expectations.

Figure 6:
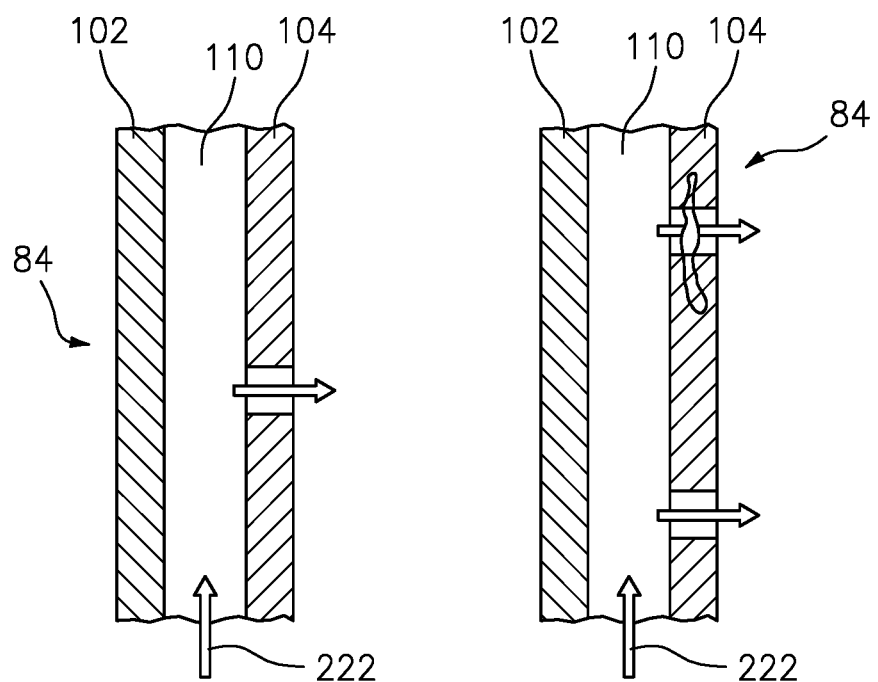
FIG. 6 is a schematic view of a wall of the example component.
Figure 7:
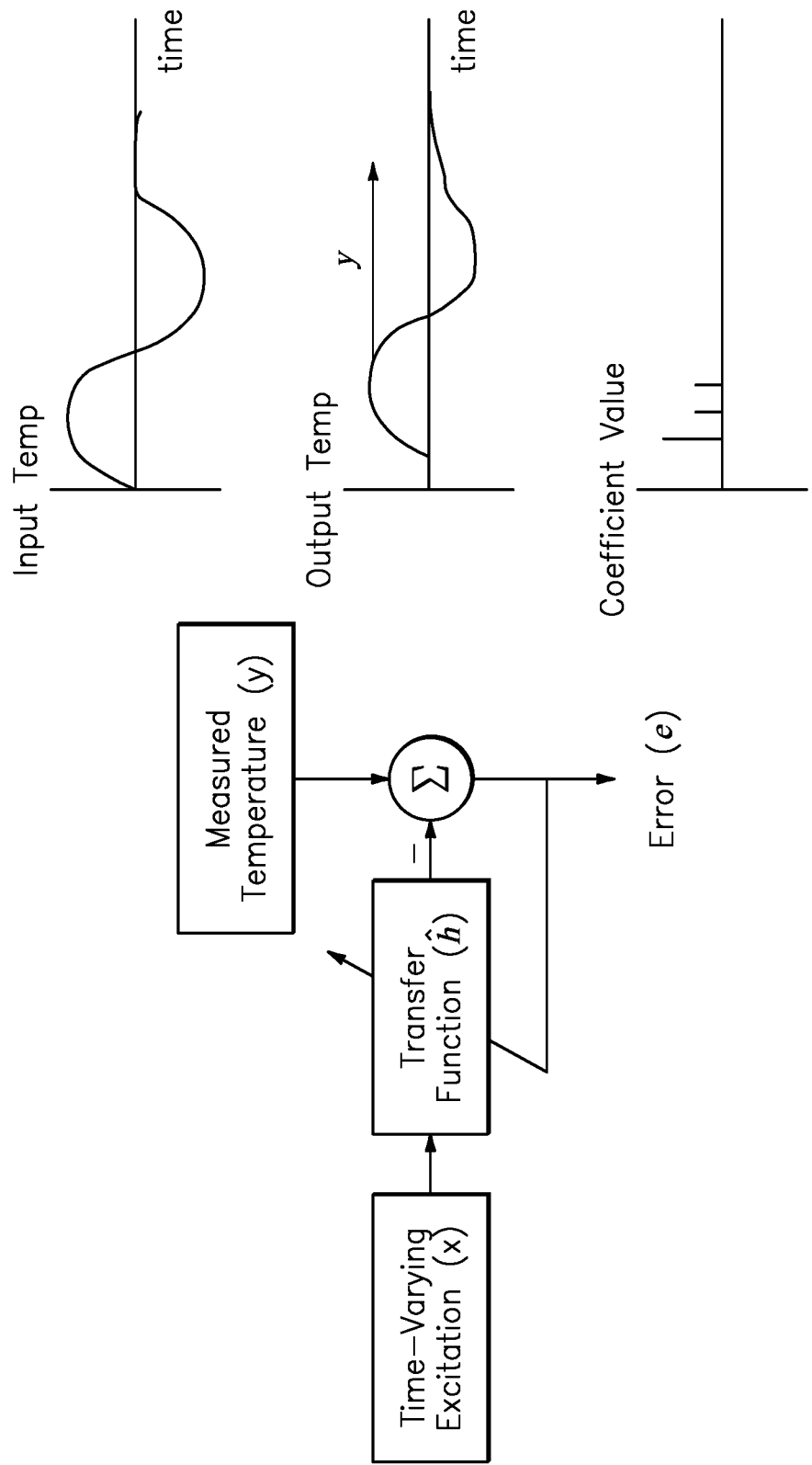
FIG. 7 is an example of a transfer function determination.

The thermal excitation source 220 blows heated or cooled air flow 222 into the array of internal passageways 110 (step 304; FIG. 6). The heated air may be at a constant temperature or may be at a time-varying temperature. Infrared radiation image data is then detected and recorded (step 306) with the thermography system 240. The recorded data includes, for example, an input air temperature of the heated or cooled air flow 222, an air flow rate through the array of internal passageways 110 via the sensor system 230, infrared radiation image data via the thermography system 240, etc. System identification techniques are next applied to the recorded data to determine thermal transfer functions (step 308) at one or more pixels (spatial locations) of the component (FIG. 7) to classify (step 310) the component under inspection. The transfer function for a surface element with an internal defect will be different from an expected transfer function. The expected transfer function may be from the same location on an undamaged component, from the same location from a previous inspection of the same component, From a structurally and thermally similar location on the component, from a structural-thermal model of the component design, and the like. The current infrared radiation image data is registered to infrared reference image data to compare the measured transfer function for each pixel of the current infrared radiation image data to at least one transfer function for infrared reference image data to classify the component based on the comparing.

Referring now to FIG. 7A, in one embodiment, determination of the thermal transfer function utilizes a time-varying excitation, e.g., the temperature of the heated and cooled air 222 blown into the array of internal passageways 110 and a simultaneously recording of the infrared radiation image data via the thermography system 240. The thermography system 240 measures each pixel of a 2D surface element on the component to generate the infrared radiation image data. The ratio of output as a function of time (y) to the input as a function of time (x) is the transfer function ($\hat{h}$). The transfer function may be computed as a bulk transfer function where there is no modeling or distinct computation of heat transfer in the internal structure behind each surface element. The computation of the bulk transfer function may be performed via a least mean squares (LMS) adaptive filter. In this LMS adaptive filter formulation, the transfer function coefficients at time t+1 are updated from time t as $\hat{h}(t+1)=\hat{h}(t)+\mu e\, x$, where the error (e) is the difference between the current measurement and the estimated value $e=y-\hat{h}(t)x$ and $\mu$ is a small constant called the step size. A schematic example input, output, and transfer function (as discrete coefficients) is depicted respectively in FIG. 7B, 7C, 7D. Alternatively, the transfer function computation may be by an LMS variant, such as normalized LMS (NLMS), by a recursive least squares (RLS) algorithm, by direct solution for the coefficients by matrix inversion, and the like. The bulk transfer function will then vary from an expected transfer function depending on the presence or absence of defects in the component.

The expected transfer function may be determined from prior measurement of known acceptable components. The difference between transfer functions may be measured, for example, by the sum of the absolute value of the coefficient-by-coefficient differences which is often referred to as the 1-norm, or Manhattan norm of the differences. Other methods may be used to characterize the difference between transfer functions such as the Bhattacharyya distance, Kantorovich metric, Kolmogorov-Smirnov statistic, Kullback-Leibler divergence, and the like. Any differences may be further analyzed to determine the cause of the difference, e.g., coating thickness too thick or too thin, poor adhesion, cracks, etc. through use of physics-based models. This also facilitates detecting incorrect airflow through the array of internal passageways 110.

Figure 8:
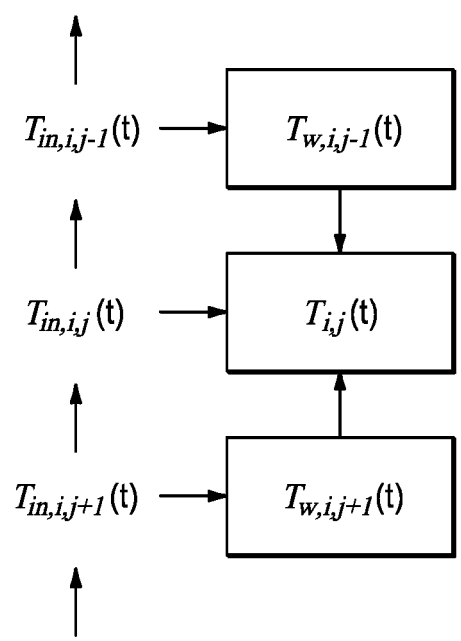
FIG. 8 is an example of a transfer function for temperature.

In this embodiment, the transfer function may be assumed to depend only on the excitation temperature and the measured surface temperature. However, the surface temperature of any particular surface element will depend on the temperature of adjacent surface elements and, with time varying excitation, may vary as the component heats and cools. Referring now to FIG. 8 (wherein the arrows denote transfer functions), the surface temperature $T_{i,j}(t)$ depends not only on the input temperature $T_{in,i,j}(t)$ through transfer function $\hat{h}_{i,j}$ (as previously described herein), but also on the temperature of adjacent surface elements (equivalently, the adjacent structure) and corresponding transfer functions. FIG. 8 depicts the effect of the adjacent wall (surface) temperature (only one dimension depicted) on the surface temperature $T_{i,j}(t)$. That is, $T_{i,j}(t)$ depends on $T_{w,i,j+1}(t)$ and $T_{w,i,j-1}(t)$ through their respective transfer functions just as they depend on their adjacent structure and input temperatures. This set of transfer functions may be estimated by an LMS (or other) algorithm as described previously herein. The benefit of this more sophisticated modeling is that it may account for variation in the surface thermal conductivities (as will be explained with reference to FIG. 9) as might result from differing surface structures, construction, materials, and the like.

Figure 9:
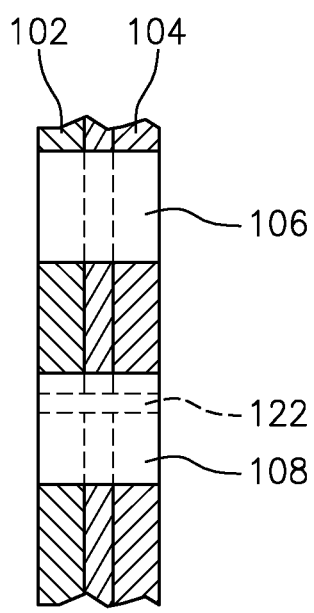
FIG. 9 is a schematic view of the wall of the example component composed of multiple materials.
Figure 10:
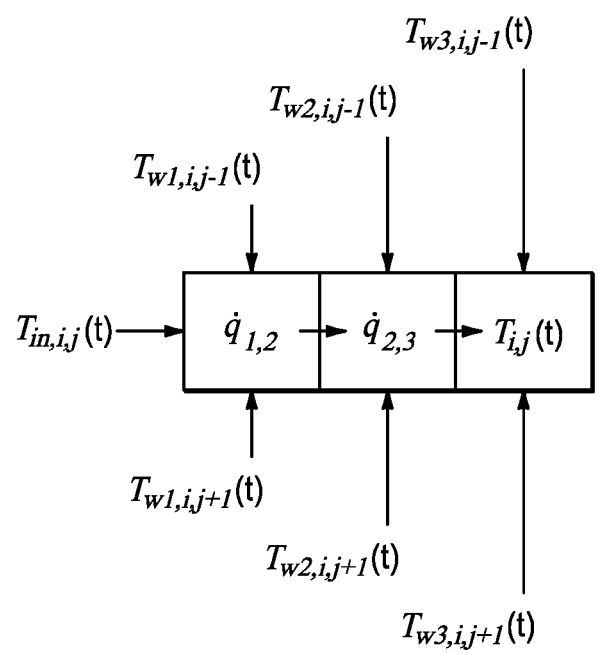
FIG. 10 is a transfer function model of the multiple materials of the wall of FIG. 9.

With reference now to FIG. 9, in another embodiment, an even more sophisticated set of transfer functions, may be computed to more accurately compute an internal to external transfer function for an entire surface such as the sidewalls 102, 104 (FIG. 3) of the component. The example component sidewalls 102, 104 (FIG. 6) behind the surface element are treated as homogeneous and the bulk properties thereof may be implicitly measured in computing the transfer functions. Increased accuracy may be further obtained by modeling the internal structure of a component behind each surface element, (FIGS. 9 and 10). This is particularly valuable where each EBC an TBC layer is modeled separately since a defect in the EBC, TBC, or interface between layers will be more pronounced when compared to non-defect values. That is, the sidewalls 102, 104 may be depicted as being composed of multiple different materials (three shown; FIG. 9) with an internal structure, cooling hole 122, from the array of internal passageways 110 therethrough. The internal structure of each surface element 106, 108 may then be modeled as shown in FIG. 10. That is, the surface temperature $T_{i,j}(t)$ does not depend directly on the input temperature $T_{in,i,j}(t)$ through a transfer function $\hat{h}_{i,j}$ (as previously described herein), but depends indirectly on the input temperature $T_{i,j}(t)$ through a more complicated set of transfer functions, adjacent temperatures in different structural layers, etc. As described elsewhere herein, the surface temperature $T_{i,j}(t)$ also depends on the temperature of adjacent surface elements and corresponding transfer functions.

FIG. 10 depicts the effect of the internal structure temperatures (only one dimension depicted) on the surface temperature $T_{i,j}(t)$. The measured surface temperature as a function of time then depends on the internal temperatures of the adjacent structures and the corresponding transfer functions. In cases where there is no significant heat capacity (that is, the temperatures equilibrate rapidly such that there is no need to capture time-delay effects in the transfer functions) the transfer functions may be approximated as the relative contact areas and heat transfer coefficients ($\dot{q}$) of the materials. The values of the transfer functions coefficients may then be computed by least squares solution as described elsewhere herein.

The nondestructive coating inspection system 200 detects coating imperfections based on system identification (transfer function estimation) and comparison to expectations. The nondestructive ultrasonic damage detection system 200 facilitates automated visual inspection that reduces cost of poor quality (COPQ) from faulty human visual inspection; reduces turn-backs from subsequent inspector disagreement; reduces dependence on increasingly scarce skilled inspectors; reduce inspection time and cost, increase inspector efficiency; and gathers machine-readable data on part condition for repair scheduling, life estimation, (re)design, and training.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward", "aft", "upper", "lower", "above", "below", and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A nondestructive coating inspection system, the system comprising:
   an airflow source to direct one or more of heated and cooled air into a component;
   a sensor directed toward the component to generate an infrared radiation image data of the component heated by the heated air; and
   a controller in communication with the sensor to register the current infrared radiation image to at least one infrared reference image data, wherein the controller is operable to estimate a thermal transfer function at one or more pixels of the current infrared radiation image for comparison to a thermal transfer function at one or more pixels of the at least one reference image; comparing the thermal transfer function at one or more pixels of the infrared radiation image to a thermal transfer function at one or more pixels of at least one reference image; determining a difference between the thermal transfer function at one or more pixels of the current infrared radiation image to the thermal transfer function at one or more pixels of the at least one reference image; and classifying the component based on the comparing.

2. The system as recited in claim 1, wherein the sensor comprises a thermography system.

3. The system as recited in claim 2, wherein the thermography system comprises one or more of a short-wave infrared (SWIR) module, a mid-wave infrared (MWIR) module, a long-wave infrared (LWIR) module, a very long-wave infrared (VLWIR) module, and a broadband infrared module.

4. The system as recited in claim 3, wherein the thermography system utilizes beam splitters to view the component through a single lens.

5. The system as recited in claim 1, further comprising an image recognition algorithm to match a location of the component against a database that contains images of previously inspected components wherein the images of previously inspected components have associated previous transfer functions.

6. The system as recited in claim 5, wherein the database comprises a multiple of reference images.

7. The system as recited in claim 5, wherein the transfer function of a location of a component and a previous transfer function is utilized to determine acceptable and unacceptable components.

8. The system as recited in claim 7, wherein the database is utilized to score a component being inspected.

9. A method for nondestructive coating inspection of a component, the method comprising:
   communicating one or more of heated and cooled air into a component;
   determining an infrared radiation image data of the component at least one of before, during, and after the heated air is communicated into the component;
   estimating a thermal transfer function at one or more pixels of the current infrared radiation image, the thermal transfer function at one or more pixels of the at least one infrared reference image is a representation of an ideal component;
   comparing the thermal transfer function at one or more pixels of the infrared radiation image data to a thermal transfer function at one or more pixels of at least one reference image;
   determining a difference between the thermal transfer function at one or more pixels of the current infrared radiation image to the thermal transfer function at one or more pixels of the at least one reference image; and classifying the component based on the comparing.

10. The method as recited in claim 9, wherein classifying the component comprises identifying whether the component is acceptable or unacceptable.

11. The method as recited in claim 9, wherein determining the difference between the thermal transfer functions comprises determining one or more of a sum of the absolute value of the coefficient-by-coefficient differences, a Bhattacharyya distance, a Kantorovich metric, a Kolmogorov-Smirnov statistic, and a Kullback-Leibler divergence.

12. The method as recited in claim 9, further comprising determining a cause of the difference, a cause of the difference comprises determining at least one of a coating thickness, adhesion, or crack in a coating of the component.

13. The method as recited in claim 9, wherein the difference determines whether the component is acceptable or unacceptable.

14. The method as recited in claim 9, further comprising modeling an internal structure of a component at one or more pixels of the current infrared radiation image.

\* \* \* \* \*